Feb. 24, 1931. F. A. COWAN 1,793,588

MEASURING AND MONITORING CIRCUITS FOR TELEPHONE LINES

Filed Sept. 25, 1929

INVENTOR
F. A. Cowan
BY
ATTORNEY

Patented Feb. 24, 1931

1,793,588

UNITED STATES PATENT OFFICE

FRANK A. COWAN, OF EAST ORANGE, NEW JERSEY, ASSIGNOR TO AMERICAN TELEPHONE AND TELEGRAPH COMPANY, A CORPORATION OF NEW YORK

MEASURING AND MONITORING CIRCUITS FOR TELEPHONE LINES

Application filed September 25, 1929. Serial No. 395,046.

This invention relates to telephone circuits, and in particular to means for monitoring, or measuring the transmission characteristics thereof.

The usual practice in taking measurements on a telephone line is to impress an alternating current of known frequency and amplitude on the line at one point and to take measurements on the amplitude or energy level at other points, thus giving information as to the losses or gains due to the line or apparatus introduced into the line.

In general, while such measuring or monitoring apparatus is bridged across the line and is of high impedance, it may react on the line in such a manner as to modify its characteristics or may alter the readings to be taken on other measuring apparatus at other points on the line. The purpose of this invention is to avoid such effects by a circuit arrangement in which the reaction on the line is zero or is independent of the changes in the measuring apparatus, and also in which the measurements at any point are independent of changes made on the line beyond the point of measurement.

To this end I provide a circuit in which the measuring apparatus is connected in conjugate relationship to the portion of the transmission line beyond the measuring point.

Figure 1:
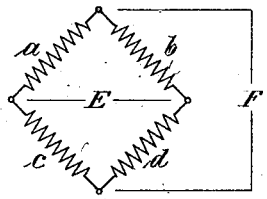
Figure 2:
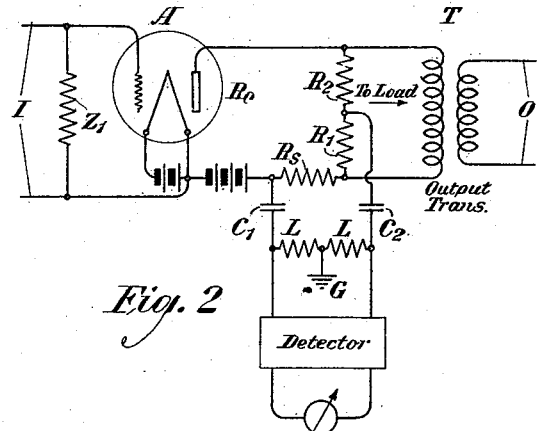
Figure 3:
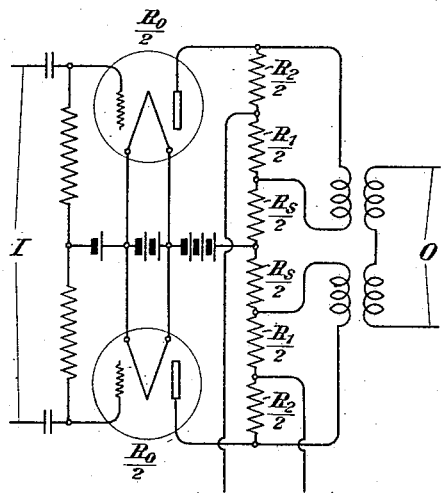
Figure 4:
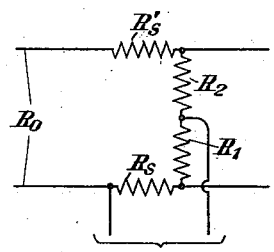
Figure 5:
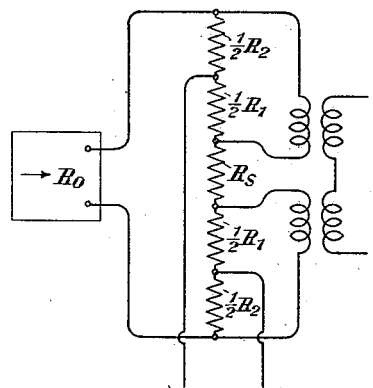
Figure 6:
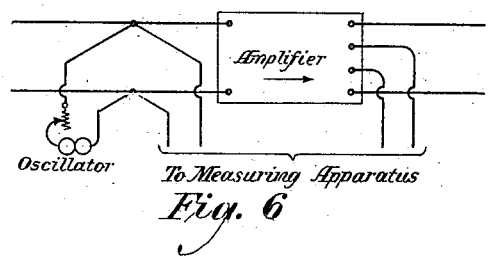

The invention will be better understood by reference to the following specification, taken in connection with the accompanying drawing, in which Figure 1 is a diagrammatic drawing to assist in the explanation of the following figures; Fig. 2 is a circuit showing the application in one of its simpler forms in connection with a repeater; Fig. 3 is a modification of Fig. 2 arranged to give symmetry to the two sides of the transmission line; Figs. 4 and 5 are analogous to Figs. 2 and 3, respectively, and show the invention applied to a line independently of any repeaters or similar apparatus which may be associated thereto; and Fig. 6 shows a method by which the change in energy level due to a piece of apparatus, such as an amplifier, may be made without disconnecting it from the transmission line.

The operation of the invention depends essentially upon a well known property of the Wheatstone bridge. Fig. 1 of the drawing shows four impedances $a$, $b$, $c$ and $d$ interconnected to form the four arms of a Wheatstone bridge. Certain devices E and F are connected in the diagonals of the bridge. It is a well known property of the bridge that when the four impedances have the relation $$\frac{a}{b}=\frac{c}{d},$$

whatever happens in one diagonal is entirely independent of what takes place in the other diagonal. For example, if a source of E. M. F. acts in the arm $a$, it will produce current in both of the diagonals, but any change in one diagonal will have no effect on what takes place in the other. If one of the diagonals contains a source of E. M. F., no current due to this source will flow in the other diagonal. Under these conditions the Wheatstone bridge is said to be balanced, and the two diagonals constitute two conjugate branches.

In Fig. 2 there is shown an incoming telephone line I and an outgoing line O, with a vacuum tube amplifier or repeater A introduced. Across the input of the amplifier there is bridged an impedance $Z_1$ of a suitable value to match in a desired way with the incoming transmission line. The outgoing line is shown here as associated with the amplifier by means of a transformer T, this being of a suitable turn ratio to match the impedance of the repeater set to the impedance of the outgoing line. The resistance $R_S$, $R_1$ and $R_2$ are connected in series with the plate circuit of the vacuum tube, and the primary of the output transformer is connected in parallel with the resistances $R_1$ and $R_2$. These three resistances, together with the A. C. plate circuit resistance $R_O$ of the vacuum tube, form a Wheatstone bridge of which the output transformer forms one diagonal and the connection to the measuring apparatus forms the other.

If these resistances are so chosen that $$\frac{R_S}{R_O}=\frac{R_1}{R_2},$$

the bridge is balanced, and the voltage impressed on the level measuring apparatus by waves amplified in the vacuum tube is independent of the impedance connected to the output transformer or to changes in the said impedance. If $E_O$ is the E. M. F. acting in the plate circuit of the vacuum tube, then $E_1$, the voltage acting on the level measuring apparatus, assumed to be of high impedance, is given by $$E_1 = E_0 \frac{R_S}{R_S + R_O}$$

Also, if the repeater impedance has been matched with the outgoing line in accordance with well established practice, then $E_L$, the voltage impressed upon the outgoing line, neglecting losses due to resistances and transformer, is given approximately by $$E_L = \frac{E_O}{2} \sqrt{\frac{R_L}{R_O}}$$

where $R_L$ is the impedance of the line for which the output transformer is designed; that is, the impedance of the outgoing line as seen from the secondary of the transformer.

The level that would be impressed on the nominal line would, of course, be greater than that indicated by the level measuring device by the following factor:

$$K = 20 \log 10 \frac{E_L}{E_1} = 20 \log 10 \frac{1}{2}\left(1 + \frac{R_O}{R_S}\right)\frac{R_L}{R_O}$$

Having found this factor once for all for a particular circuit, the proper value of the transmission level as impressed on an outgoing line having normal impedance can be calculated from observations made on the measuring apparatus.

The measuring apparatus may take on a variety of forms, and in Fig. 2 it has been shown in simplified manner as consisting of a detector and a meter M of any appropriate character. It is also seen that the resistances $R_S$, $R_1$ and $R_2$ would always be at the potential of the plate battery with respect to ground. This might cause undesired deflections of the meter of the measuring apparatus, but such effects can be avoided by connecting the condensers $C_1$ and $C_2$ in series with the leads to the measuring apparatus. In this case it will also be desirable to connect high resistances $L_1$ and $L_2$ between the two condensers, the midpoint thereof being connected to ground G.

The resistances $R_1$ and $R_2$, taken together, should be made as large as possible in order to avoid excessive loss on through transmission, but should not be large enough to cause appreciable error in the indication of the transmission measuring apparatus, this latter being preferably of still higher impedance. Also, $R_S$ should be taken as low as feasible in order that the transmission loss due to it shall be kept reasonably small. For example, $R_2$ might be of the order of several thousands of ohms, and $R_S$ might very well be of the order of some tens of ohms.

It is to be noted that if the observer at the level measuring device at an intermediate point on a long repeatered circuit should unintentionally operate the key which sends out testing current, this current would not reach the line in either direction because the vacuum tube would block transmission towards the transmitting end of the circuit and the Wheatstone bridge arrangement of the resistances would prevent transmission towards the receiving end of the line, this resulting from the conjugate relationship between the measuring circuit and the outgoing line. Not only does this refer to the closing of the key of the testing circuit but would relate to any other changes made in the measuring circuit.

It will also be noted that in Fig. 2 the leads to the measuring apparatus are not balanced with respect to ground, since the one containing $C_1$ is effectively connected to A. C. ground potential while the one containing the condenser $C_2$ has potential with respect to ground, which might be a cause of crosstalk between repeater circuits. Fig. 3 shows the application of this invention to a push-pull amplifier circuit in which symmetry can be obtained so as to avoid the lack of balance just noted, as well as certain other advantages. In this Fig. 3 two sets of resistances are provided, one for each of the vacuum tubes. The value of these resistances are determined as in Fig. 2. $R_O$ is now taken as representing the A. C. impedance of the plate circuits of the two vacuum tubes in series. The two parts of the high side of the output transformer are connected respectively around the corresponding resistances $R_1$ and $R_2$, and the resistances $R_S$ are connected between the two parts of the primary of the transformer. Thus, it is seen that the arrangement for the two tubes taken together is essentially the same as that of Fig. 2, and the method of calculating the values of these resistances and the losses caused by them is the same as for Fig. 2. It will be noted, however, that the leads to the measuring apparatus are balanced with respect to ground and therefore are less likely to pick up crosstalk than is the case with the unbalanced arrangement of Fig. 2. The same connections of condensers $C_1$ and $C_2$ and leaks which are described in connection with Fig. 2 should also be used in the circuit of Fig. 3 in order to keep the plate battery potential away from the measuring apparatus.

Fig. 4 shows a circuit for applying the principles of this invention to measurements at some other point than the plate circuit of the vacuum tube. In this case $R_O$ is the impedance looking towards the source from which the waves are coming. In order to avoid unbalance a resistance $R_s'$, which is equal to $R_s$, should be connected in the opposite side of the circuit, and $R_o$ should be considered as including this additional resistance.

In this circuit, as in Fig. 2, there is a lack of balance which might lead to crosstalk between different circuits, but if a transformer is available, such as in Figs. 2 and 3, then this lack of balance can be avoided by the connection of Fig. 5, which, it will be recognized, is essentially similar to Fig. 3.

Fig. 6 shows an arrangement by which the gain of an amplifier, or the gain or loss due to any other piece of apparatus, may be measured without removing it from the circuit. In this case an oscillator and a pair of leads to the measuring device are bridged across the input terminals of the amplifier at the same point. By adjusting the output of the oscillator a wave of suitable volume may be impressed upon the input of the amplifier, and the level of the wave at this point may be measured by the level measuring device. The level of the output terminals of the amplifier may be measured as described above, it being understood that the amplifier circuit includes the resistances $R_1$, $R_2$ and $R_s$, or their equivalents. The measurements thus give the gain due to the amplifier as working into the actual circuit with which it is associated.

It has been assumed heretofore that the impedance of the measuring circuit is very high but the invention is not limited to this condition, for if the measuring apparatus is one whose impedance is not high there will be merely a correction factor of constant value to be determined either by a separate measurement or by simple calculations appropriate to such circuits.

Also, it will be noted that while the invention has been described specifically in connection with the measuring of energy level, it is equally well adapted as a means for monitoring a circuit which is free from the possibility of disturbing transmission on the circuit.

A further use of these arrangements is to provide a directionally selective bridge connection for a transmission line, this resulting from the conjugate relationship previously mentioned. If, for example, resistances are connected as shown in Figs. 4 and 5 at an intermediate point on a two-way transmission line, apparatus connected to the terminals heretofore described as those for the measuring apparatus can receive waves from or transmit waves to the line extending towards the incoming line, but can not receive waves from or transmit waves to the line in the opposite direction.

What is claimed is:
1. In a transmission line, means for measuring the transmission level without affecting the impedance of the line which comprises a Wheatstone network, the incoming line constituting one side thereof, the outgoing line constituting one diagonal thereof, and the measuring apparatus constituting the other diagonal.

2. In a transmission line, means for measuring the transmission level without affecting the impedance of the line, said means comprising series and bridge resistances; the incoming line, the series resistance and the bridge resistance constituting the four arms of a balanced Wheatstone bridge, the outgoing line and the measuring apparatus constituting respectively the two diagonals of said bridge.

3. In a vacuum tube telephone repeater, an outgoing line and a measuring circuit in the output of said repeater and arranged in conjugate relationship.

4. In a transmission line, a push-pull repeater, means for measuring energy level at a point on the line, said means comprising resistances in the output of the repeater and so associated therewith as to yield a symmetrical circuit with two pairs of conjugate points, to one of which the outgoing line is connected and to the other of which the measuring apparatus is connected.

In testimony whereof, I have signed my name to this specification this 24th day of September, 1929.

FRANK A. COWAN.